Dec. 8, 1959 C. C. MITCHELL ET AL 2,915,919
AUTOMATIC CONTROL FOR COUNTERBALANCE
Filed Jan. 20, 1958 2 Sheets-Sheet 1

CURTIS C. MITCHELL
GEORGE A. BURGON
INVENTORS

BY *Herbert J. Brown*

ATTORNEY

CURTIS C. MITCHELL
GEORGE A. BURGON
INVENTORS

United States Patent Office 2,915,919
Patented Dec. 8, 1959

2,915,919

AUTOMATIC CONTROL FOR COUNTERBALANCE

Curtis C. Mitchell and George A. Burgon, Fort Worth, Tex., assignors to American Manufacturing Company of Texas, Fort Worth, Tex., a corporation of Texas Application January 20, 1958, Serial No. 709,867

4 Claims. (Cl. 74—590)

This invention relates generally to oil field counterbalanced pumping units, and more specifically to a novel means for adjusting the balance of such units.

One object of this invention is to provide a means for automatically adjusting the counterbalance effect while the pumping unit is in operation.

A further object is to provide a fully electrically controlled automatically adjustable counterbalancing means for a walking beam pumping unit.

Another object is to provide a device wherein the balance of a counterbalanced pumping unit may be either automatically adjusted by electrical means or may be manually adjusted by electrical means, selectively.

And a still further object is to provide a fully automatic electric means for adjusting the balance of an electric driven reciprocating pumping unit which depends for its operation on the electric load variation required by the electric drive during the reciprocating stroke of a pump unit.

And yet another object is to provide an electrical system for automatically and electrically moving a balancing weight in direct proportion to the unbalanced load of a separate electrical supply circuit.

And another object is to provide in a pumping unit a novel electronic system for automatically providing a variable electrical output current to power a counterweight drive motor whenever a supply source current to the pumping unit varies in excess of a predetermined value.

These and other objects and advantages will be apparent from an examination of the following specification and drawing, in which:

Figure 2 is a cross sectional view taken along the lines 3—3 of Figure 2.

Figure 1:
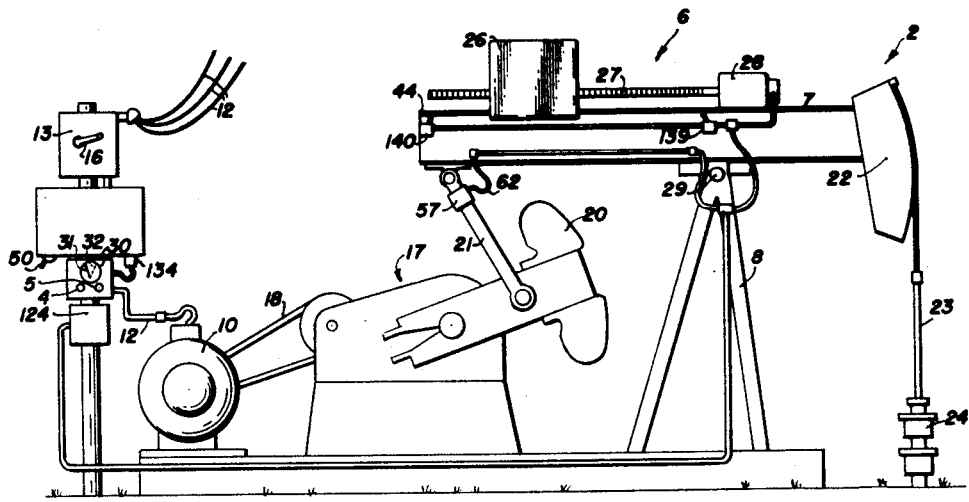
Figure 1 represents a side elevational outline view of an oil well pumping unit showing the installation of the counterbalance means of this invention.
Figure 2:
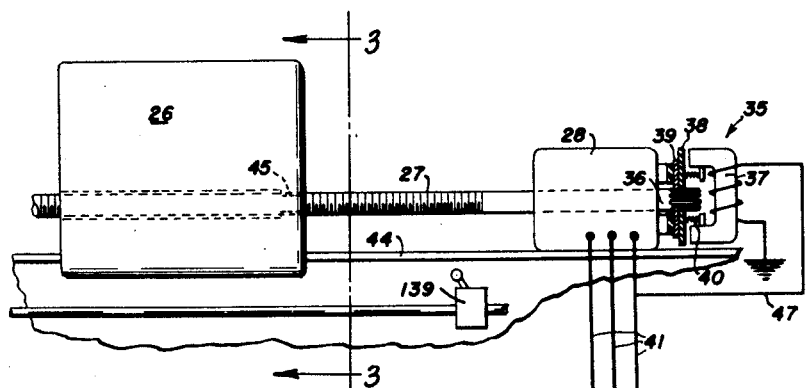
Figure 2 is a basic schematic diagram of the unique automatically adjustable counterbalance system of Figure 1.

The application is a continuation in part of copending application, Serial No. 691,639, filed October 22, 1957, by Curtis C. Mitchell for Counterbalance Control for Pumping Units, and assigned to the assignee of this invention. This reference patent application disclosed an invention which provided an electric means by which the counterbalance effect of a pumping unit could be observed and electrically adjusted but manually controlled. The instant invention provides a means by which the function of adjustment of the counterbalance effect will take place automatically and without the supervision of an attendant.

Referring now more particularly to the characters of reference of the drawing, it will be observed that the complete assembly of this automatically adjustable counterbalance system, indicated generally at 2, includes an overall electrical circuit 3 which includes a pair of selector switches 4 and 5 for adjusting by manual actuation the electrically powered counterbalance unit 6 which is mounted on the top side of the walking beam 7 of the oil well pumping unit 8, and which circuit 3 also includes a switch 50 for transferring the control of the counterbalance unit 6 to automatic actuation by virtue of a circuit 51 which is intermingled with and structurally a part of the overall control circuit identified at 3.

The electrical control circuit 3 (including circuit 51) is interposed in the regular electrical system required to operate the pump's electric drive motor 10; which system includes a suitable power supply source 11, and includes a lead 12 from the source 11 through a conventional switch box 13 to the motor 10. A master switch 16 is included to permit the operator to control the operation of the motor 10 and consequently the drive unit 17 by means of a conventional belt arrangement 18, which, through gears (not shown) supplies torque to the counterbalance crank 20. The pitman 21 converts the rotary movement of crank 20 into reciprocating movement of the walking beam 7 to which it is pivotally connected near one end. Conventionally the other end of the beam 7 includes a relatively large mule head 22 to which the polish rod 23 is flexibly connected to operate a string of sucker rods and a fluid pump at a depth in the oil well after passing through the well head 24.

In the operation of pumping unit 8, when the polish rod 23 is being moved downward, the mule head 22 is assisting the drive unit 17 in applying force to this downward stroke, but on the upward stroke, the weight of the oil being pumped must be lifted. The underground formation conditions affect the total lifting or lowering forces required and since these conditions are subject to change, for example, change in bottom hole pressure, it is impractical to attempt to set up a counterbalance system having a fixed value. Some pumping unit manufacturers have made provisions whereby the conventional counterweights may be shifted manually, and other provisions whereby separate additional weights may be added or removed from the pumping unit at the well site in an attempt to obtain an overall balanced system which is recognized as important to the performance, the work load, and the ultimate life of the equipment. However, in addition to being a time consuming manual operation which requires that the pumping unit be temporarily shut down, the manual adjustment of weights is inaccurate and is not subject to visual measurement. The mentioned copending application has greatly improved this condition, and the instant invention provides an additional improvement in this field by providing not only the extremely rapid electrically powered adjustment and its visual checking feature, but also a completely automatic electrical adjustment dependent on well conditions.

An auxiliary counterweight 26 is slidably installed on beam 7 and in movable relation with screw shaft 27 which is reversibly powered by electric motor 28 to selectively locate counterweight 26 at the proper distance from the main pivot 29 of the pumping unit 8.

Since the electrical drain from power source 11 through lead 12 is directly dependent upon the electrical load of the pumping unit drive motor 10, and since this electrical load is proportional to the physical balance, it will be seen that if the balance were correct, the needle 31 of the ammeter 30, connected in series in one lead 12, will alternately and uniformly vary between two increments during the up and down strokes. On the other hand, if the system is out of balance, the ammeter needle 31 will erratically fluctuate, thus indicating the peak loads on the up and down strokes are uneven. When the movement of the needle, as indicated at 32, is erratic, the operator knows the system is out of balance and he may then press one of the switch buttons 4 to rotate the screw shaft in one direction to thus move the counterweight 26 along the shaft 27 in the selected direction, for example, inward toward pivot 29 to correct the unbalanced condition. If this movement is in the proper direction to correct this unbalance, the movement of the needle 31 will tend to become uniform, after which the button operation is repeated until the best condition of balance is attained. In the event the movement of the counterweight 26 is in the wrong direction, the swing of the needle will immediately become more erratic, and the other switch 5 is then pressed to cause a reverse rotation of motor 28 and its screw shaft 27. In order to prevent any unintentional movement of shaft 27 and consequently a required relocating of the auxiliary counterweight 26, there has been installed an electrically released, spring engaged, disc type brake 35 on the extension 36 of the motor shaft 27 which projects beyond the motor 28 on the side opposite the counterweight 26. The brake 35 includes an electro-magnet 37 which exerts an attraction force on a sliding but non-rotating disc 38 to pull it away from the rotating disc 39 and against the pressure of springs 40. When there is no current in the leads 41, the pressure of springs 40 is sufficient to press the disc 38 against the disc 39 with a braking force and thu prevent any rotation of the shaft 27. However, when there is a current in the leads 41 the electro-magnet 37 is energized through its coil lead 47 and the brake is released.

Figure 3:
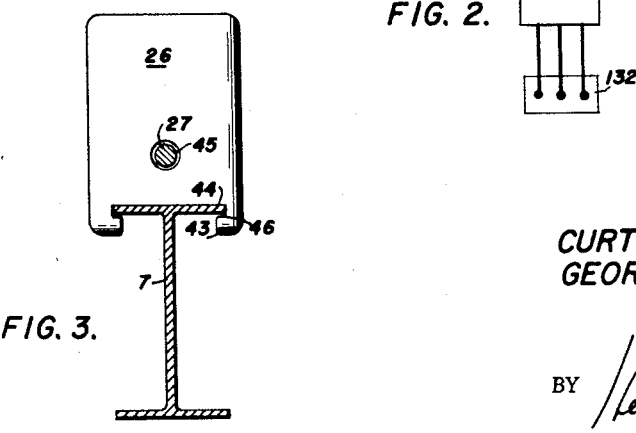

The auxiliary counterweight 26 may be either fabricated or cast in the configuration shown in Figure 3, so as to include a pair of inwardly extending lugs 43 which define a horizontally extending recess 46. By sliding the counterweight recess 46 into engagement with the top edge 44 of beam 7, a horizontally sliding but retained engagement is obtained so that the counterweight 26 is free to be moved along the top of beam 7 either toward or away from the beam pivot 29 by the forward or reverse rotation of shaft 27 (by its motor 28) acting against the internal threads 45.

In order to provide a fully automatic electrically controlled and electrically powered counterweight adjusting device, the circuit 51 has been added to the basic circuit 3 previously described. When the operation is to be placed on "automatic," both the switches 4 and 5 remain open and the automatic circuit switch 50 is closed, and the circuit 51 is now ready for operation whenever the master switch 16 is engaged. When this happens the leads 53 are energized and consequently the time delay relay 54 and the relay supply transformer primary coil 55 are energized by a voltage (110 v.) from transformer 56 and simultaneously the drive motor 10 is placed in operation to rock the walking beam 7. When the pumping unit 8 is in the position shown in Figure 1, the crank 20 is in the process of rotating in a clockwise direction and the polish rod 23 of the pump is being lifted (on its up stroke), and during this half of the cycle, the mercury switch 57 is in its "off" position. At this point, with the relay contacts 58 and 59 in the position shown, there will be an energization through the "up" section of the automatic sensing and control circuit 51 which includes the "up" condenser 60 and resistor 61. Now when the crank 20 has passed beyond its bottom dead center and the mercury switch 57 has tilted and closed, so that the leads 62 will be energized to consequently energize the coil 63 of relay 64 to move the arms 65 and 165 against the contacts 66 and 166 and place the "down" sensing condenser 67 and resistor 68 into operation. The time involved between the up and down cycles of the pumping unit 8 is faster than the discharge or decay time of the condensers so that having received a signal in a manner to be described, each condenser will hold onto its charge through possibly several strokes before actuating the control elements of circuit 51.

The signal itself is an electrical voltage which is generated in the leads 69 due to the sensing coil 70 which surrounds one lead of the power supply leads 12 to the pump drive motor 10. It is well known that the current flowing through the supply leads to an electric motor will increase as the load on the motor increases, and it is recognized that the peak electrical loads to a motor driving a reciprocating device will be substantially equal if the summation of the up stroke forces are equal to the summation of the down stroke forces, (i.e. if the device is in dynamic balance). Hence the sensing coil 70 will pick up an electrical balance sensing signal which is transmitted through leads 69, a rheostat 71, leads 72, bridge rectifier 73, and contacts 58 to the up sensing condenser 60. And consequently when the pumping unit 8 is in its down stroke cycle, the signal voltage is directed through contacts 66 to the down sensing condenser 67. The output leads 74 and 75 of the condensers 60 and 67 respectively are connected together through resistors 76 and 77 which together with the ground connection 78 form a voltage divider circuit to establish a ground reference. Lead 74 then passes through a filter resistor 79 and to one grid 80 of the amplifier (electron) tube 81. Similarly the lead 75 engages the second grid 82 of tube 81, through resistor 83. The resistors 79 and 83 and their corresponding condensers 84 and 85 form a filter for each of the leads 74 and 75.

The output from the plates 86 or 87 of tube 81 is proportional to the signal on their grids 80 and 82, and this output at the appropriate point in the cycle is delivered through lead 88 or 89 to the corresponding grid 90 or 91 of the output (electron) tube 92, and it is the output of this tube which ultimately determines the direction of rotation of the counterweight adjustment motor 28.

Continuing with the up stroke analysis, and assuming the motor 10 has its greatest load on this stroke, the condenser 60 will then accummulate the greater charge and the grid 80 of tube 81 will have a positive charge (with reference to the ground potential) and cause a current flow through plate 86, whereas the grid 82 of the same tube will be negative with reference to ground 78 and will tend to prevent a current flow through its corresponding plate 87. A current flow in lead 88 will cause grid 90 to go more negative and prevent an output current in lead 93 from plate 94. Whereas the grid 91 being neutral, or at least more positive than grid 90, will permit a current flow through lead 95 from plate 96. The lead 95 then connects and passes through relay coil 97 and back through lead 98 at junction 99 and back to junction 100 of D.C. plate supply circuit 101. Now as current passes through the coil 97, the relay switch arm 102 moves from its normal engagement with contact 103 to an engagement with contact 104; however, at this time there is no movement of relay arm 105 since its relay coil 106 is not energized as the current path from junction 99 through coil 106 and lead 93 would terminate at an open end at plate 94. Of course it will be observed that the reverse is true when the "down" stroke sensing condenser 67 carries the larger charge and a current will then flow from plate 94 through lead 93, coil 106, junction 99 and through lead 98 and resistor 107 to junction 100. And at this latter instant there will be no flow through lead 95, since its plate 96 will create a break in this circuit.

Returning to that point in the cycle when arm 102 has engaged contact 104, it is seen that a circuit will be completed through leads 108, 109, relay coil 110, leads 111 and 112 and through secondary transformer coil 113. This latter coil is energized from the primary coil 55 in lead 53 which connects with the transformer 56 in the power supply leads 11. This being the case, the relay coil 110 is energized and its contact arms 115—117 move into engagement with contacts 118—120, to complete a circuit through contact 120, arm 117, and leads 121, 48, secondary coil 122 of transformer 56, and coil 123 of reversing switch 124 of the counterweight control motor 28. The energization of coil 123 will close contacts 125 to complete the counterclockwise rotation circuit of motor 28 through leads 41 to move the counterweight 26 by means of shaft 27 away from the pivot 29 so that this counterweight 26 will then assist the pumping unit 8 in its up stroke, since this stroke was shown to require the greater load on the motor 10.

When the balance between the load on the up stroke and the down stroke has returned to its normal condition (substantially equal), then there is a negligible output voltage in either lead 95 or 93 and neither relay coil 97 nor 106 will be energized sufficiently to open and no current will be supplied to the motor switch coils 123 or 126 so that the counterweight 26 will not be moved.

Then if the dynamic balance of the operation later becomes such that the motor 10 has a greater load on the down stroke of the polish rod 23, then a similar electrical sequence will occur to supply a reversing current to motor 28 and cause it to move the counterweight 26 in toward the pivot 29.

A resistor 127 is placed in circuit between the condensers 60 and 67 by the engagement of arm 116 and contact 119 or the engagement of arm 216 and contact 219 whenever the motor 28 is running in either direction for the purpose of bleeding off the condensers. The various condensers and resistors in the circuit 51 and circuit 101 which are not numbered perform their usual functions, which may be to prevent surges in the current and for filter purposes and for obtaining desired circuit characteristics. Circuit 101 also includes the heater elements 135—137 for the amplifier tube 81 and the output tube 92 and for the full wave rectifier tube 138. The resistors 128 and 129 provide a sensitivity control for the direct coupled tubes 81 and 92. And the voltage regulator tube 130 and 131 maintain a steady voltage for the cathodes of tubes 81 and 92. The terminals shown in the panel (or plug) 3 in Figure 4 correspond to those of the electrical connector (or socket) 134 of Figure 1. A pair of plate load resistors 145 and 146 are inserted between the supply circuit 101 and the plate output leads 88 and 89, respectively.

The electrical and time values throughout the circuit and especially with reference to delay relay 54 and the relays employing coils 97, 106, 110 and 210 are so chosen that erratic operation and hunting will be avoided. It will be apparent that neither motor switch coil 123 nor 126 will be energized when its corresponding limit switch 139 or 140 is opened by the desired maximum movement of the counterweight 26.

Figure 4:
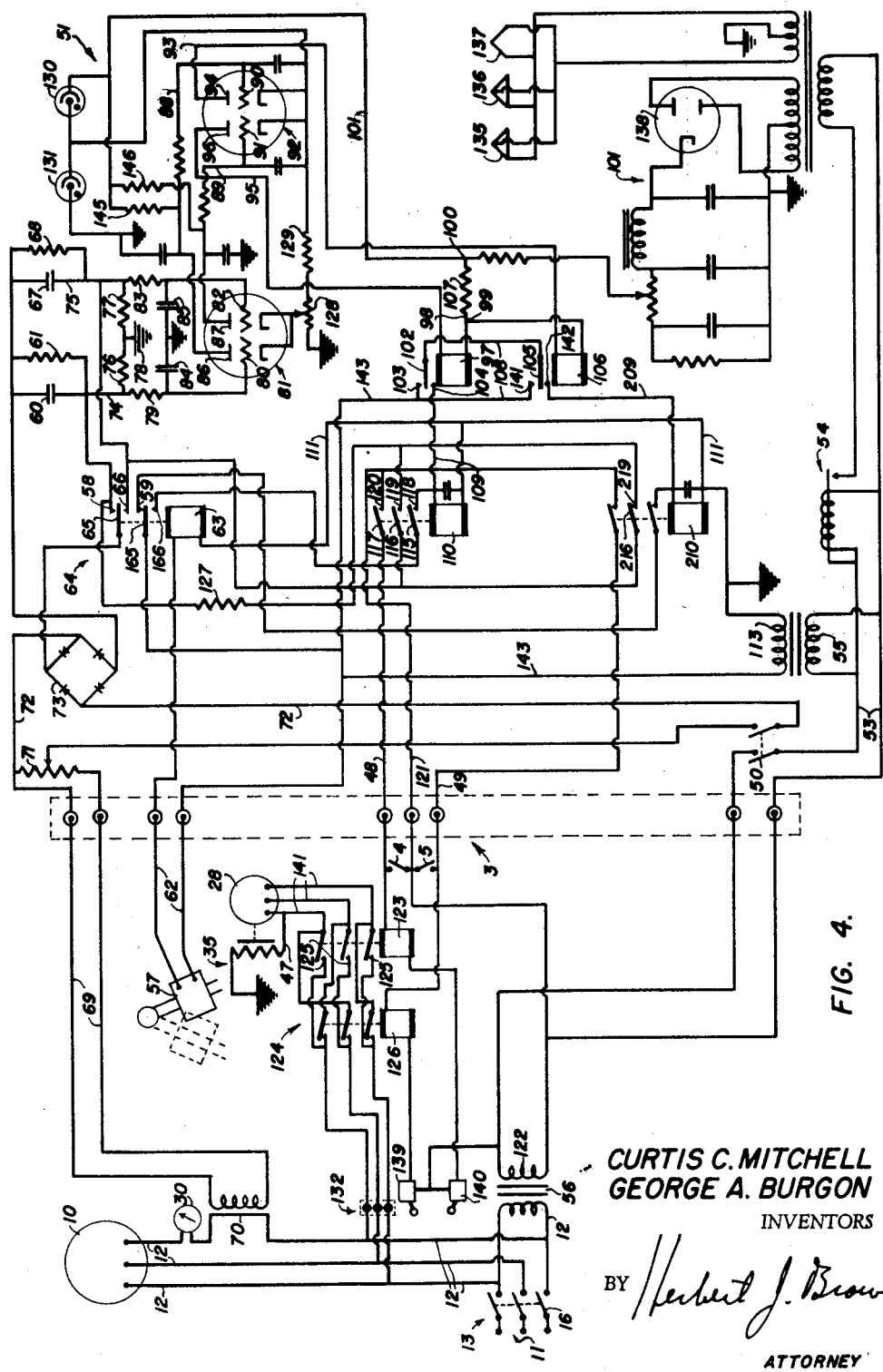
Figure 4 is a circuit diagram, partly in schematic of the detailed electronic circuitry employed in this invention.

As a safety feature in this circuit, when the contact arms 102 and 105 of the plate relays (coils 97 and 106) are in their unenergized position (as shown in Figure 4), they rest against the contacts 103 and 141. Now upon energization of either coil 97 or 106, one of the arms, say 105, will be moved into engagement with its other contact 142, and an electrical circuit may be completed through lead 209, one loop of lead 108, through contact 103 and arm 102 and into the lead 143 including transformer secondary 113. Similarly, when coil 97 is energized a circuit is completed through both loops of lead 108 and through the arm 105 and contact 141. If, however, by some misfeasance in the circuit, both coils 97 and 106 were energized there could be no completion of a power circuit since one or the other of contacts 103 or 141 must be closed. It should be noted that the relays having coils 110 and 210 are holding relays and will remain in a closed condition as long as a current is present in their supply leads 143, 112, 111 and 108, and a current can exist in these leads only when one or the other of coils 97 or 106 is energized. The relay 64 is a holding type relay also, but it is released during every cycle of the pump when the switch 57 is opened.

The invention is not limited to the exemplary construction herein shown and described, but may be made in various ways within the scope of the appended claims.

What is claimed is:

1. A method of automatically correcting a condition of physical unbalance in a pivoted beam pumping unit driven by an electric motor having power supply leads, comprising: detecting the variation in the electrical current in the power supply leads to indicate the electrical unbalance of the supply load to the motor during its operating cycle and obtaining therefrom an electric signal, and shifting a counterweight by electrical means to the most advantageous balance position relative to the beam pivot, and supplying power to said counterweight shifting means to correct the balance of said pumping unit whenever the detecting means indicate an unbalanced condition.

2. A method of automatically correcting a condition of physical unbalance in a pivoted beam pumping unit driven by an electric motor having power supply leads, comprising: detecting the variation in the electrical current in the power supply leads to indicate the electrical unbalance of the supply load to the motor during its operating cycle and obtaining therefrom an electric signal, and shifting a counterweight by electrical means to the most advantageous balance position relative to the beam pivot, and automatically supplying power to said counterweight shifting means to correct the balance of said pumping unit whenever the detecting means indicate an unbalanced position.

3. A method of automatically correcting a condition of physical unbalance in a pivoted beam pumping unit driven by an electric motor having power supply leads, comprising: detecting the variation in the electrical current in the power supply leads to indicate the electrical unbalance of the supply load to the motor during its operating cycle and obtaining therefrom an electric signal, and shifting a counterweight by electrical means to the most advantageous balance position relative to the beam pivot, and manually or automatically supplying power selectively to said counterweight shifting means to correct the balance of said pumping unit whenever the detecting means indicate an unbalanced condition.

4. A method of correcting a condition of physical unbalance of a pumping unit driven by an electric motor, comprising: connecting a current detecting means in circuitry with the drive motor to detect the unbalance of the peak loads of the motor supply current during the operation of the pumping unit, and electrically and automatically adjusting a balance weight on the pumping unit to a position to correct an unbalance in the peak loads.

References Cited in the file of this patent

UNITED STATES PATENTS

| | | |
|---|---|---|
| 2,432,735 | Downing | Dec. 16, 1947 |
| 2,726,490 | Lowe | Dec. 13, 1955 |
| 2,808,735 | Becker | Oct. 8, 1957 |